United States Patent
Aaronson

(10) Patent No.: US 7,908,239 B2
(45) Date of Patent: Mar. 15, 2011

(54) SYSTEM FOR STORING EVENT DATA USING A SUM CALCULATOR THAT SUMS THE CUBES AND SQUARES OF EVENTS

(75) Inventor: Philip Aaronson, Mountain View, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 12/906,683

(22) Filed: Oct. 18, 2010

(65) Prior Publication Data

US 2011/0029990 A1  Feb. 3, 2011

Related U.S. Application Data

(62) Division of application No. 11/684,479, filed on Mar. 9, 2007, now Pat. No. 7,840,523.

(51) Int. Cl.
*G06F 15/00* (2006.01)
(52) U.S. Cl. .......................................................... 706/62
(58) Field of Classification Search .................... 706/12, 706/14, 16, 25, 56–58, 62; 709/224
See application file for complete search history.

(56) References Cited

U.S. PATENT DOCUMENTS

| | | | |
|---|---|---|---|
| 7,171,333 B2 * | 1/2007 | Nassif | 702/179 |
| 7,693,836 B2 * | 4/2010 | Brave et al. | 709/224 |
| 2002/0046273 A1 * | 4/2002 | Lahr et al. | 709/224 |
| 2007/0271205 A1 * | 11/2007 | Aravamudan et al. | 706/12 |

* cited by examiner

*Primary Examiner* — David R Vincent
(74) *Attorney, Agent, or Firm* — James J. DeCarlo; Greenberg Traurig, LLP

(57) ABSTRACT

Systems and methods are disclosed herein for aggregating event data in order to reduce the amount of storage space necessary to store event data for later use in statistical analyses of the event data. The raw event data is analyzed and, for each event ID within a time period, a specific set of numbers and sums are calculated. This set is then stored instead of the raw event ID and used for all subsequent analyses of the events. The set of numbers and sums reduce the amount of storage required for each event ID within a time period to a set of five data elements, regardless of the number of underlying events in the raw event data. The set of number and sums include a number of events, a sum of the events, a sum of the squares of the events, a sum of the cubes of the events and a sum of the events raised to the fourth power.

5 Claims, 4 Drawing Sheets

SYSTEM FOR STORING EVENT DATA USING A SUM CALCULATOR THAT SUMS THE CUBES AND SQUARES OF EVENTS

CROSS REFERENCE TO RELATED APPLICATIONS

This application is a divisional of, and claims priority from co-pending U.S. patent application Ser. No. 11/684,479, filed on Mar. 9, 2007, now U.S. Pat. No. 7,840,523 entitled METHOD AND SYSTEM FOR TIME-SLICED AGGREGATION OF DATA, which is incorporated herein by reference.

BACKGROUND

Web site operators typically track user interactions with their web sites in order to determine the effectiveness of the web pages of a web site and their layout. This tracking often includes recording one or more particular user interactions related to a given web page. The operators typically prefer to obtain as much information as possible about these interactions, often tracking such metrics as the number of clicks on specific hyperlinks or advertisements on a web page, identifiers of the feature or features clicked on, the time spent viewing a web page, or the number of times an ad was displayed on a web page. To record this information each individual user interaction is monitored and information describing it is stored in a record of some type. A record of an individual user interaction may be referred to as an "event". An event may include such information as an indication that a hyperlink or an advertisement was displayed to, clicked on by or otherwise interacted with by a user; an identifier of the user, the item clicked on, viewed, or otherwise interacted with, or the web page; date and time of the user interaction; software or equipment used by the user; and one or more metrics associated with the user interactions such as an amount paid in a purchase transaction, or time spent in an activity. For example, one event may be a single user click on a hyperlink and another event may be a display of a specific advertisement. Each event is recorded as raw event data for later analysis to determine the effectiveness of the web page.

Storage of the raw event data represents a significant burden on operators of large web sites, as the number of events can be quite large and often the data is stored for long periods of time in order run many different analyses on the data.

In addition to the storage burden, the processing of the raw event data is also time-consuming as the raw event data is typically reprocessed for each analysis. Several different approaches had been adopted for processing this raw event data. Processing of raw event data retains the native resolution and no intermediate processing is performed. However, each analysis requires a reprocessing of the entire data set. Furthermore, if processing is done in real time, as new data are received the intermediate calculations become progressively more expensive.

Another typical approach is a random partitioning of the raw event data. In this approach, the events in the raw event data for a specified period of time are randomly selected and aggregated together into several partitions for that time period. Averages and other metrics for each partition are then determined. This partition data, and not the raw event data, is then used to characterize the distribution of the data for the time period, so reprocessing is not required when performing subsequent analyses. However, depending on the number of partitions, and typically on the order of 30 to 40 are used, this represents a significant loss of resolution from the raw event data where thousands or tens of thousands of individual samples may have been taken.

Thus, the operator is left with the choice of storing and processing large sets of raw event data which yield the higher resolution results or storing and processing smaller aggregated data partitions but with a potential loss of resolution in the results.

SUMMARY

The methods and systems described herein perform intermediate calculations on the raw event data in such a way that the intermediate results themselves are summable across time periods so no reprocessing of the underlying raw data is required, like the random partition. However, no underlying resolution is lost, like reprocessing of the raw data. The systems and methods disclosed herein aggregate event data in order to reduce the amount of storage space necessary to store event data for later use in statistical analyses of the event data. The raw event data is analyzed and, for each event ID within a time period, a specific set of numbers and sums are calculated. This set is then stored instead of the raw event data and used for all subsequent analyses of the events. The set of numbers and sums reduce the amount of storage required for each event ID within a time period to a set of five data elements, regardless of the number of underlying events in the raw event data. The set of number and sums include a number of events, a sum of the events, a sum of the squares of the events, a sum of the cubes of the events and a sum of the events raised to the fourth power.

In one aspect, the disclosure describes a method of storing data describing user interactions with a web page. The method includes publishing a web page on a network and monitoring user interactions with the web page. The method further includes recording event data derived from one or more user interactions with the web page, in which the event data stored contains a plurality of events associated with a designated time period and a designated event identifier and each event includes information generated based on a user interaction. The method then identifies, based on the plurality of events, a plurality of samples associated with the designated time period and the designated event identifier, in which each sample includes a numerical value derived from one or more user interactions. The method then stores a number of samples in the plurality of samples in a first data element associated with the designated time period and the designated event identifier. The method also calculates a straight sum of the numerical value for each sample and stores the straight sum in a second data element associated with the designated time period and the designated event identifier. The method also squares the numerical value for each sample thereby obtaining a square of the numerical value for each sample, sums the squares of the numerical value for each sample thereby obtaining a sum of the squares and stores the sum of the squares in a third data element associated with the designated time period and the designated event identifier. The method also cubes the numerical value for each sample thereby obtaining a cube of the numerical value for each sample, sums the cubes of the numerical value for each sample thereby obtaining a sum of the cubes and stores the sum of the cubes in a fourth data element associated with the designated time period and the designated event identifier. The method also raises the numerical value for each sample to a power of four, sums the numerical value raised to the power of four of each sample thereby obtaining a sum of the numerical values raised to the power of four and stores the sum of the numerical values raised to the power of four in a fifth data element associated with the designated time period and the designated event identifier. The method then deletes the plurality of events from the event data and retains, for future analysis as data describing user interactions with a web page, the first data element, the second data element, the third data element, the fourth data element, and the fifth data element for subsequent analysis in long term storage.

Another aspect of the disclosure is a system for generating and storing representative data describing events. The system includes a short-term datastore that stores event data derived from one or more user interactions with the web page in which the event data contains a plurality of events associated with a designated time period and a designated event identifier and each event includes a numerical value generated based on a user interaction. The system further includes a sum calculator that generates, from the event data, a number of events in the plurality, a straight sum of the events in the plurality, a sum of the squares of the events in the plurality, a sum of the cubes of the events in the plurality, a sum of the events in the plurality raised to the power of four. The system also includes a long-term datastore that stores the number and sums generated by the sum calculator as representative data of the events associated the designated event identifier within the designated time period.

Yet another aspect of the disclosure is a method for storing sample data for future analysis. The method includes recording a plurality of events associated with a designated time period and a designated event identifier, in which each event containing information related to a different user interaction. The method includes deriving a set of samples from the plurality of events, in which each sample contains a numerical value generated based on one or more of the plurality of events. The method then stores a number of samples in the set in a first data element associated with the designated time period and the designated event identifier; a straight sum of the samples in a second data element associated with the designated time period and the designated event identifier; and a sum of squares of the samples in a third data element associated with the designated time period and the designated event identifier. The method then deletes the plurality of events and performs subsequent statistical analyses associated with the designated time period and the designated event identifier using only one or more of the first data element, the second data element, and the third data element.

Yet another aspect of the disclosure is a method for generating user interaction data associated with an event identifier for a time period that includes a plurality of time slices. The method includes retrieving, for each of the plurality of time slices, a number, a straight sum, a sum of the squares, a sum of the cubes, and a sum of the fourths of events associated with the event identifier and calculating, for the time period, an aggregate number, an aggregate straight sum, an aggregate sum of the squares, an aggregate sum of the cubes, and an aggregate sum of the fourths of events associated with the event identifier from the retrieved numbers, straight sums, sum of the squares, sum of the cubes, and sum of the fourths for the plurality of time slices. Then the method uses the aggregate number, the aggregate straight sum, the aggregate sum of the squares, the aggregate sum of the cubes, and the aggregate sum of the fourths as user interaction data associated with an event identifier for the time period instead of using the raw data for each of the time slices.

These and various other features as well as advantages will be apparent from a reading of the following detailed description and a review of the associated drawings. Additional features are set forth in the description which follows, and in part will be apparent from the description, or may be learned by practice of the described embodiments. The benefits and features will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The following drawing figures, which form a part of this application, are illustrative of embodiments systems and methods described below and are not meant to limit the scope of the invention in any manner, which scope shall be based on the claims appended hereto.

DETAILED DESCRIPTION

The methods and systems described herein perform intermediate calculations on the raw event data in such a way that the intermediate results themselves are summable across time periods so no reprocessing of the underlying raw data is required, like the random partition. However, no underlying resolution is lost, like reprocessing of the raw data. The systems and methods disclosed herein aggregate event data in order to reduce the amount of storage space necessary to store event data for later use in statistical analyses of the event data. The raw event data is analyzed and, for each event associated with an event ID within a time period, a specific set of numbers and sums are calculated. This set is then stored instead of the raw event data and used for all subsequent analyses of the events.

One aspect of this approach is to process all events of the same type (i.e., event ID) into five data elements, those being the count of samples (nsample), a straight sum of the event metric (sum1), a sum of squares (sum2), sum of cubes (sum3) and a sum of the event to the fourth power (sum4) for each time period. Each of these values can then be summed together without loss of resolution to characterize the distribution of events for multiple time periods, and even anomalous time periods can be filtered out. These metrics drive more standard means of experimental comparison. The sum1 is the basis for mean, sum2 is the basis for variance, sum3 for skewness and sum4 for kurtosis.

Figure 1:
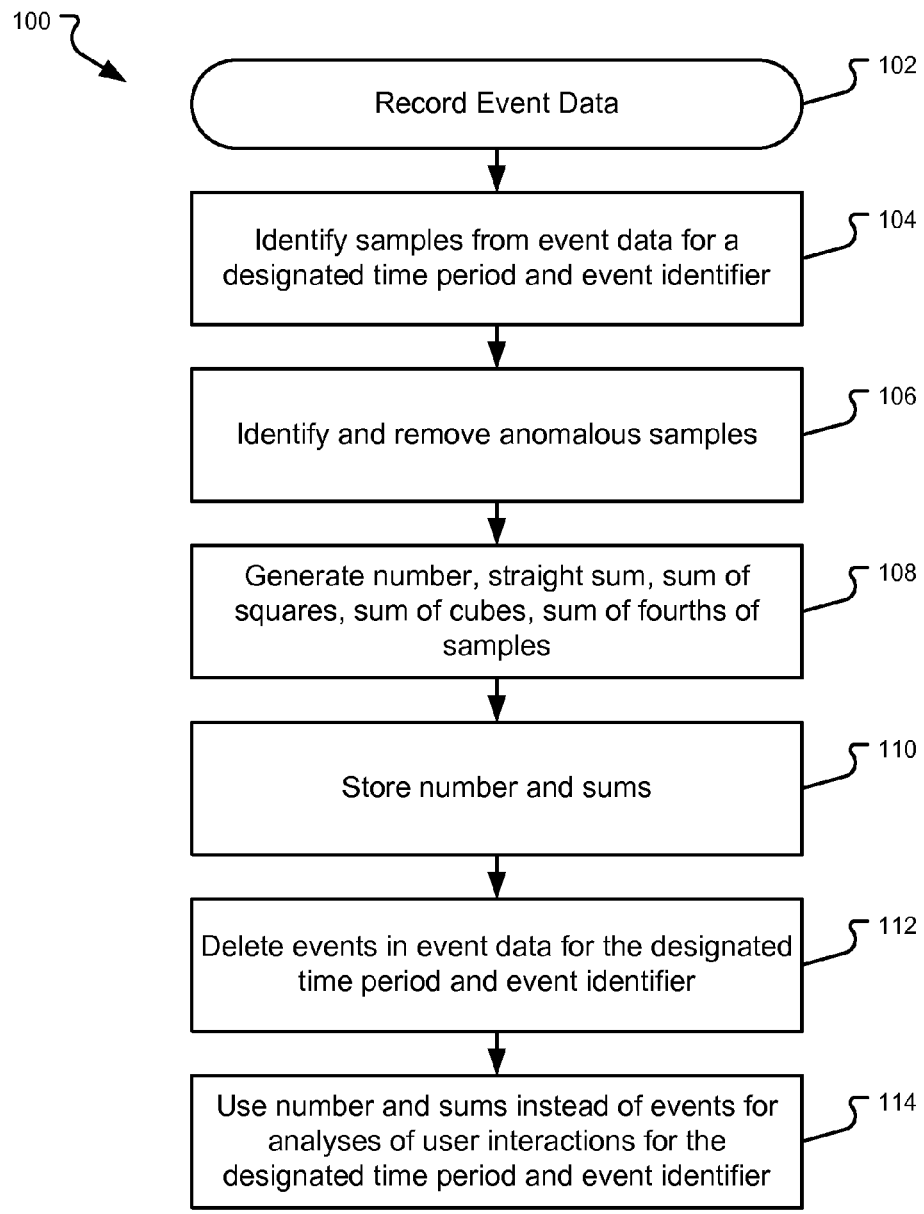
FIG. 1 illustrates an embodiment of a method for generating a set of numbers and sums that describe all events associated with an event ID in a time period.

FIG. 1 illustrates an embodiment of a method for generating a set of numbers and sums that incorporate all events associated with an event ID in a time period. The method may be repeated for each event ID until all the events associated with each ID in a particular time period have been analyzed and a set of number and sums generated for each event ID. In an embodiment, the method may be performed automatically at the end of each time period, such as part of an automated event data archiving process.

In the embodiment shown, the method 100 begins with recording event data by data gathering module or some other part of the system that operates or monitors the web page. This operation is referred to as the record event data operation 102. While the event data for the web page recorded in each event may vary depending on the system, in an embodiment the data recorded for each event includes or otherwise is associated with an event ID. An event ID indicates the type of event (e.g., a click on a specific item on a specific web page, or a display of a specific item on a specific web page). The event may be associated with a time period in many different ways, e.g., each event may include a time stamp, may include a unique sample number from a time period may be calculated or may be stored in an event log associated with a specific time period. In the embodiment, each event may further include information such as a user identifier, an identifier the web page associated with the event, an identifier of one or more media files or advertisements. Some of the information may be simple numerical values associated with a parameter of the event. For example, the amount of money spent in a purchase may be stored as a numerical value within an event. However, some events may not include such a numerical value, e.g., a user click event may include only the user identifier of the user clicking on the web page.

After recording the event data for a specific period, an identification operation 104 identifies all the events associated with a specific event ID in the designated time period being analyzed. In an embodiment, the identification operation 104 may be driven by the analysis being performed. For example, if the desired analysis is to determine how much money was spent in transactions via the web site for the period, the identification operation 104 would identify all purchase events. Each event associated with a transaction event ID may then include a numerical value for the transaction amount, and these numerical values then are used when generating the set of number and sums as described in greater detail below.

In an alternative example, the identification operation 104 may need to aggregate different events in order to identify the proper set of events and derived the numerical values to be further characterized by the five data elements. For example, if the specific event ID is that of user clicks on a web page during the time period, the analysis may wish to determine data based on all users interacting with the web page. In an embodiment, each user click results in an event being stored in the log identifying the user and the web page clicked on. In this embodiment, the identification operation 104 may first identify and count all of the user clicks associated with each user that interacted with the web page. Thus the identification operation 104 may generate an intermediate set of event data which may look like "User1, 10 clicks; User2, 2 clicks; User3, 220 clicks; . . . . Usern, 43 clicks." This intermediate set of event data then is used when generating the set of number and sums as described in greater detail below, i.e., the number will be the number of users (n) that clicked on the web page, the straight sum will be the sum of all clicks on the web page (10+2+220+ . . . +43), the sum of squares will be $10^2 + 2^2 + 220^2 + \ldots + 43^2$, etc. The numerical value being analyzed in this example, then, is not contained within the event data itself, but rather identified and derived from the event data based on the desired analysis in an intermediate operation.

The identification operation 104 (which may alternatively be referred to as a sample derivation operation 104 to illustrate that the samples may be either identified or generated by this operation depending on the event ID being processed), then, includes performing the actions necessary to identify the samples, being the set of numerical values, to be further processed based on the desired analysis to be performed. The samples may be individual events each with its own numerical value, such as purchase events, or may be numerical values derived from events in the event data, such as representative of user clicks per user or of advertisements shown per user. Such sample identification may involve a simple extraction of numerical values from events associated with one or more event IDs, or may include additional processing in order to derive the numerical values from the events in the event data.

The event data for the time period may then be analyzed with a preliminary statistical analysis that removes any anomalous data, such as test events or other raw event data identified as potentially skewing the results of a future analysis. The removing of anomalous data operation 106 is an optional operation and may or may not be performed every time numbers and sums are generated.

Following the removal of anomalous events, a generation operation 108 generates the numbers and sums from the identified numerical values as will be described in detail herein. The numbers and sums generated by the system include a calculation of the number of identified samples from the event data for the designated time period and the designated event ID. The number is just a standard addition to determine how many events for the designated event ID are in this data set for the time period.

In addition to the number of identified samples, a set of sums are also calculated. As described before, each identified sample consists of some numerical value derived from the user's interaction. The first sum generated by the generation operation 108 will be referred to herein as a straight sum and is a simple addition of the numerical values of each identified sample being analyzed. The second sum, referred to as the sum of squares, is the sum obtained by squaring each numerical value associated with each identified sample and summing those squared values. The generation operation 108 also generates a sum of cubes, which is obtained by raising each numerical value to a third power (i.e., cubing it), and summing each of the cubes of the numerical values. Another sum generated by the system is a sum of fours. Sum of fours are obtained by raising each numerical value for each sample in the identified set to the power of four and summing the resulting values. In this way, from the event data in the identified sample set for an event ID within a time period, the generation operation 108 generates a number of events for the identified set, a straight sum, a sum of squares, a sum of cubes, and a sum of fours. These five data elements are used to represent the entire set of samples identified in an identification operation 104, regardless of the number of samples identified.

These five elements, referred to as the number and sums for the event ID and designated time period, are then stored in a long-term data storage in a storage operation 110. The reader will note that a large data set of potentially thousands of samples/events, can thus be compacted into five data elements generated from the data set, thus reducing the amount of data to be stored significantly. Furthermore, it has been determined experimentally that these five data sets, when analyzed, retain approximately the same resolution as would be obtained when analyzing the raw data itself, i.e., when analyzing each of the numerical values of each of the samples/events themselves in the identified set, from operation 104.

After storing the numbers and sums in the storage operation 110, the event data identified in operation 104 is no longer necessary. In an embodiment, this event data is then deleted in a deletion operation 112 and removed from the short-term storage area in which it had resided after being gathered in the recording operation 102. All future analyses, as illustrated by analysis operation 114, will utilize the five data elements, the numbers and sums for the time period and the event ID. As discussed above, the reduction in the amount of data required to maintain a record of user interactions achieved by the method 100 allows this data to be stored much longer than would normally be the case and, further, reduces the cost of storing event data for a particular time period. Furthermore, the processing power necessary to perform any analyses is reduced because the raw data does not need to be re-evaluated each time an analysis is performed.

Figure 2:
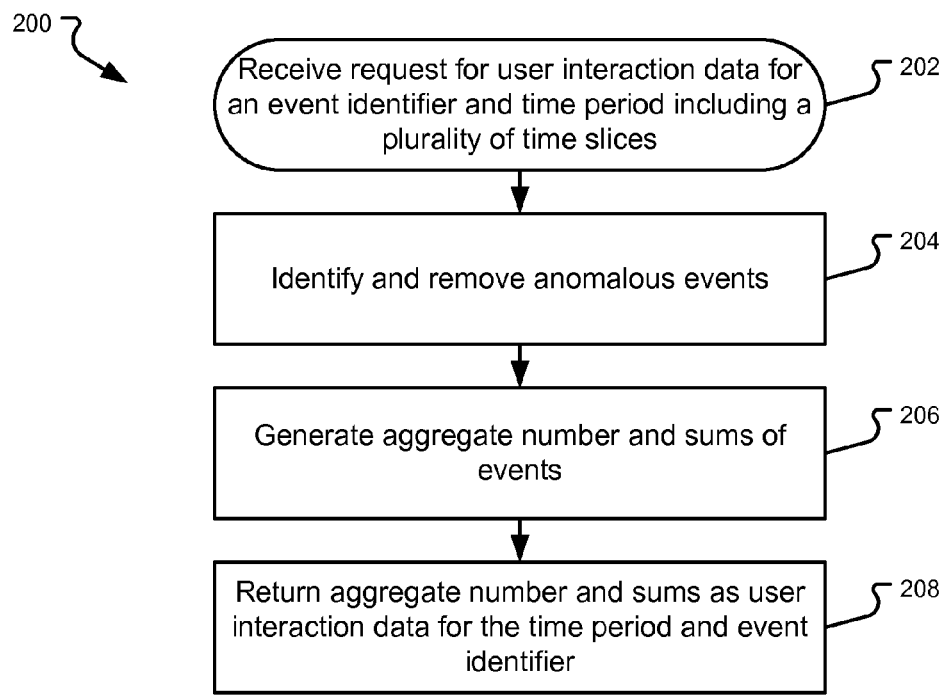
FIG. 2 illustrates an embodiment of a method for subsequent analysis of the numbers and sums generated by the method described in FIG. 1.

FIG. 2 illustrates an embodiment of a method for subsequent analysis of the numbers and sums generated by the method described in FIG. 1. FIG. 2 illustrates just one manner in which the numbers and sums may be analyzed, such as for future determination of the effectiveness of a web page or to determine patterns of user interactions with the web page.

The method 200 begins with a receive request operation 202 in which a request is received by the analysis system for user interaction data for one or more individual time periods, now referred to as time slices, that make up a given larger time period and for a specific event ID. The appropriate numbers and sums for various time slices and event ID are retrieved from the long-term storage and provided to the analytical system.

The analytical system may then perform another removal of anomalous results in a removal anomalous results operation 204. This operation 204 is optional and may be performed using any standard statistical analysis to identify and subsequently remove anomalous results.

After the anomalous results are removed, the generation operation 206 then generates a set of numbers and sums for the desired event ID and the period (i.e., the collection of time slices) by performing the same analysis as described in the generation operation of FIG. 1. Thus, from the number of events in each time slice, a total number of events in the time period are generated by summing the number of events for each time slice. Likewise, from the number of squares in each time slice, a number of squares for the time period are generated by simply summing each number of squares for each time slice in the desired time period. Likewise, a sum of cubes is created by simply summing each sum of cubes for each time slice, and a sum of fours is also created. For the purposes of distinguishing the sums of the time period from the sums of the individual time slices within the time period, the number and sums for the time period will be referred to as "aggregate" number and "aggregate" sums. Thus, for the time period there will be an aggregate number, an aggregate straight sum, an aggregate sum of squares, an aggregate sum of cubes, and an aggregate sum of fours.

The analysis system then analyzes this aggregate number and sums using an analysis operation 208. In this way, from number and sums of time slices recorded in long-term storage, any time period may be analyzed for any event ID while the need for long-term storage is greatly reduced. Furthermore, the processing power necessary to perform any analyses is reduced because the raw data does not need to be re-evaluated each time an analysis is performed.

Figure 3:
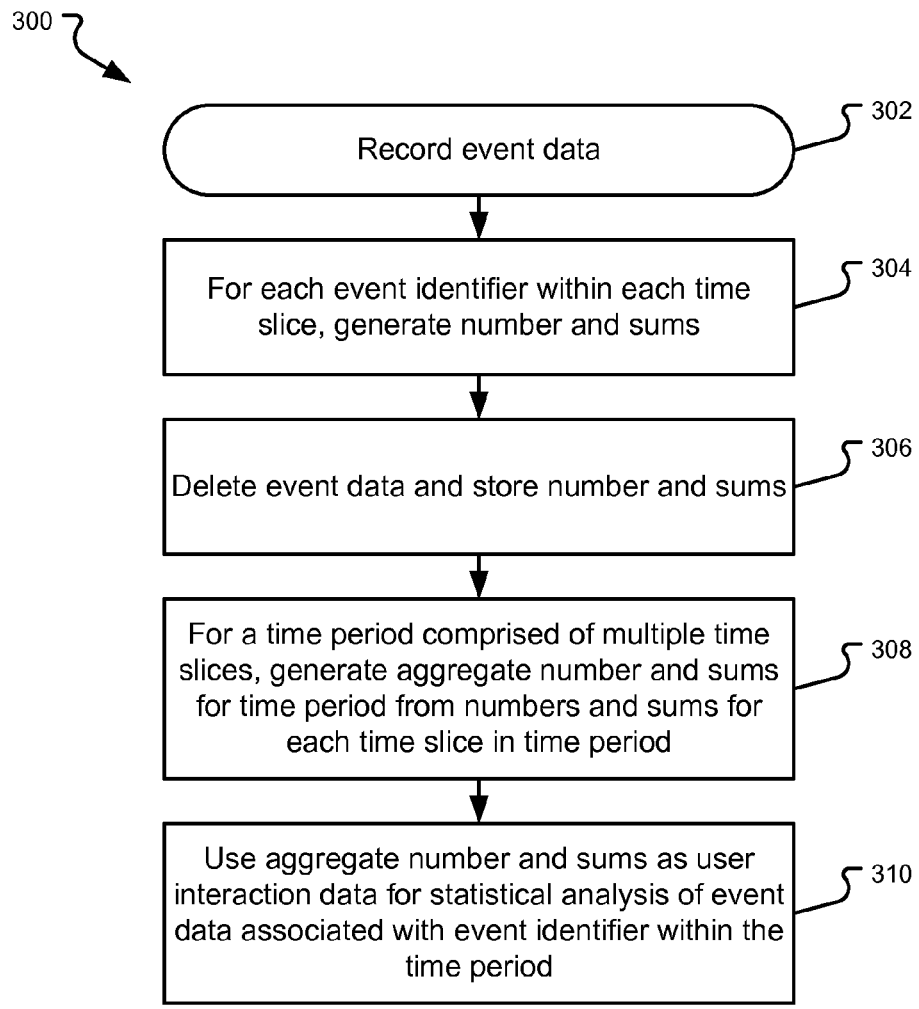
FIG. 3 illustrates a high level embodiment of a method for reducing the need for long-term storage space to store data identifying user interactions, such as with a web page.

FIG. 3 illustrates a high level embodiment of a method for reducing the amount of data recording user interactions, such as with a web page, stored by a user interaction monitoring system. In the method 300, the method begins with a record event data operation 302. The record event operation 302 typically occurs through the use of a data gathering module as described in FIG. 4. The event data, consisting of individual user interaction events associated with an event ID and a numerical value within a specified time span, is stored such as in an event data log as the user interactions are received by the system. After the event data for a given individual atomic period of time, as defined by the system, which may also be referred to as a time slice, has been recorded, the data is then analyzed with the subsequent operation to generate a data set for long-term storage.

This analysis begins with an identification or selection of an event ID and a time slice to be analyzed. After the event ID and time slice have been selected, the event data recorded in the recording operation 302, is analyzed, and numbers and sums are generated that describe the system. In an embodiment, a generation operation 304, generates a set of five numbers and sums that are used to characterize the user interactions for that event ID for the time slice in question. As described in greater detail above, the five data elements are a number of samples associated with the event ID in the time slice, which may also be considered the number of occurrences of an event of a specified event ID within a time slice, a straight sum of a numerical values of the events, a sum of squares that is a sum of the square of the numerical values of the events, a sum of cubes which is a sum of the cubed numerical values for each event, and a sum of fours.

These five data elements are then stored in long-term storage and the root set of raw events may then be deleted at the deletion operation 306.

Subsequent analysis of the five data elements for each time slice and event ID is then performed in one or more analysis operations 308. In an analysis operation 308 for a time period comprising multiple time slices, the system generates an aggregate number and sums for the time slice in the event ID from the number and sums of each time slice within the time slice for the same event ID. The number and sums are calculated in the same manner using the number and sums of the time slices now instead of events.

Thus, in the analysis operation 310, the aggregate number and aggregate sums for the period created from the number and sums of each time slice are then used for all statistical analysis of the user interaction for the remaining analysis performed. In this manner, the raw events in the event data may be deleted nearly substantially immediately after the closure of each time slice depending on the ability of the system to analyze and generate the number and sums.

Figure 4:
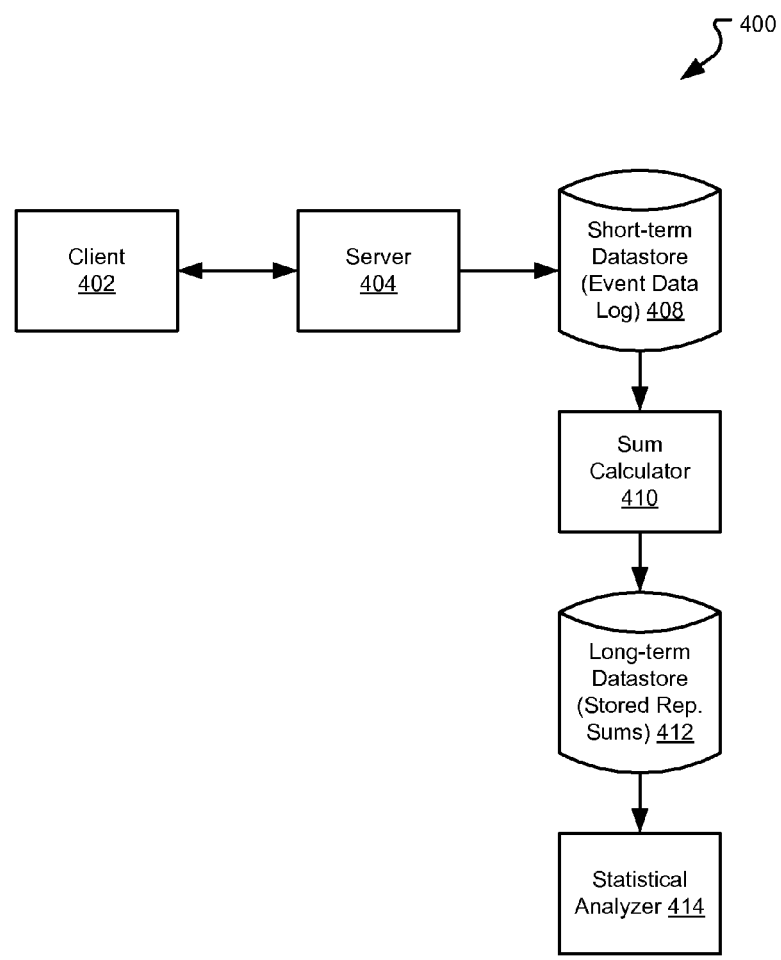
FIG. 4 illustrates a computing architecture in accordance with an embodiment of the present invention.

FIG. 4 illustrates a computing architecture in accordance with an embodiment of the present invention. In the system 400, a server 404 serves the web page, published or otherwise accessible on a network such as the internet, to at least one client 402 for display to a user. A user interacts with the web page by clicking on links or otherwise accessing resources in the web page. Each user interaction results in a message or other information being transmitted back to the server 404 from the client 402. The server 404 has a data gathering module (not shown) that, from the messages or information received, tracks the user interactions and generates event data. As described before, the event data consists of individual events that are stored into a short-term datastore 408. In an embodiment, the short-term datastore 408 contains an event data log that consists of a listing of each event as chronologically recorded by the data gathering module. As described above, each event is associated with an event ID and a time or a time slice.

Upon or at some point after completion of a given time slice, a sum calculator 410 analyzes the event data and generates numbers and sums that are representative of all the events in the event data for the time slice and the different event IDs that occurred during the time slice. The sum calculator 410 generates these in one of the manners as described above.

The numbers and sums generated by the sum calculator 410 are stored in a long-term datastore 412. Thus, the amount of memory in the long-term datastore 412 is considerably smaller than the amount of memory necessary for storing the event data.

The system 400 is also provided with a statistical analyzer 414. The statistical analyzer 414 is utilized by the operators of the web page to analyze the data; in this case, the number and sums for each time slice and event ID to determine how effective their website is at causing various user interactions. Analysis may be performed in any suitable way depending on the purposes of the operators, including those as described above.

One aspect of this approach is to process events for an event ID into five key characteristics, those being the count of samples (nsample), a straight sum of the event metric (sum1), a sum of squares (sum2), sum of cubes (sum3) and a sum of the event to the fourth power (sum4) for each time period. Each of these values can then be summed together without loss of resolution to characterize the distribution of events for multiple time periods, and even anomalous time periods can be filtered out. These metrics drive more standard means of experimental comparison. sum1 is the basis for mean, sum2 is the basis for variance, sum3 for skewness and sum4 for kurtosis.

Stage 1: Experimental versions of a web page, or portions of a web page are presented to a test subject. Their actions are collected utilizing a metric collection infrastructure.

Stage 2: The experimental samples/events are collected for processing by user interaction monitoring infrastructure.

Stage 3: Anomalous, or outlying events can be filtered out.

Stage 4: A time period for each event ID is processed into the five key characteristics.

Stage 5: Individual anomalous, or outlier time periods can be filtered out from the result aggregation.

Stage 6: Final aggregation is performed over the time slices and a single descriptive result is obtained.

Generically, the raw event data is composed of an event metric (a click, a view, etc).

The data recorded for each event may include an event identifier and, depending on the event identifier may also include a metric in the form of a numerical value. Alternatively, the metric may be derived from the events. In addition, the event data may further include or be associated with (for example, because of where or how the event data is stored) information such as a user identifier, the time the event occurred, and an identifier the web page associated with the event. Further data may also be included depending on the ultimate analysis to be performed on the data.

Those skilled in the art will recognize that the methods and systems of the present disclosure may be implemented in many manners and as such are not to be limited by the foregoing exemplary embodiments and examples. In other words, functional elements being performed by a single or multiple components, in various combinations of hardware and software or firmware, and individual functions, can be distributed among software applications at either the client or server level or both. In this regard, any number of the features of the different embodiments described herein may be combined into single or multiple embodiments, and alternate embodiments having fewer than or more than all of the features herein described are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, and those variations and modifications that may be made to the hardware or software or firmware components described herein as would be understood by those skilled in the art now and hereafter.

While various embodiments have been described for purposes of this disclosure, various changes and modifications may be made which are well within the scope of the present invention. For example, instead of event data, any large set of data could benefit from the methods and systems herein as long as the raw data can be decomposed to a numerical value associated with a type. Numerous other changes may be made which will readily suggest themselves to those skilled in the art and which are encompassed in the spirit of the invention disclosed and as defined in the appended claims.

What is claimed is:

1. A system comprising:
    a short-term datastore associated with a computer-readable storage medium that stores event data derived from one or more user interactions with the web page, the event data containing a plurality of events associated with a designated time period and a designated event identifier, each event containing a numerical value generated based on a user interaction;
    a sum calculator, implemented by a computing device, that generates, from the event data, a number of events in the plurality, a straight sum of the events in the plurality, a sum of the squares of the events in the plurality, a sum of the cubes of the events in the plurality, a sum of the events in the plurality raised to the power of four; and
    a long-term datastore associated with a computer-readable storage medium that stores the number and sums generated by the sum calculator as representative data of the events associated the designated event identifier within the designated time period.

2. The system of claim 1 wherein the sum calculator provides the number and sums to the long-term datastore for storage.

3. The system of claim 1 further comprising:
    at least one statistical analyzer that analyzes the representative data stored in the long-term datastore.

4. The system of claim 1 wherein the sum calculator generates, from the event data and for each different event identifier associated with events within the designated time period, a number of events, a straight sum of the events, a sum of the squares of the events, a sum of the cubes, a sum of the events in the plurality raised to the power of four; and
    wherein the long-term datastore stores all the numbers and sums generated by the sum calculator as representative data for all events within the designated time period.

5. The system of claim 1 wherein the short-term datastore deletes the plurality of events associated with the designated time period and the designated event identifier after the sum calculator has generated the number and sums.

* * * * *